(12) United States Patent
Samuels

(10) Patent No.: US 10,464,369 B1
(45) Date of Patent: Nov. 5, 2019

(54) VEHICLE WHEEL RIM WITH INTEGRAL SPARE TIRE

(71) Applicant: Glenford Samuels, Orlando, FL (US)

(72) Inventor: Glenford Samuels, Orlando, FL (US)

( * ) Notice: Subject to any disclaimer, the term of this patent is extended or adjusted under 35 U.S.C. 154(b) by 111 days.

(21) Appl. No.: 15/895,033

(22) Filed: Feb. 13, 2018

(51) Int. Cl.
| | |
|---|---|
| *B60B 15/26* | (2006.01) |
| *B60B 11/10* | (2006.01) |
| *B60C 7/24* | (2006.01) |
| *B60B 11/06* | (2006.01) |

(52) U.S. Cl.
CPC ............ *B60B 15/263* (2013.01); *B60B 11/06* (2013.01); *B60B 11/10* (2013.01); *B60B 15/26* (2013.01); *B60C 7/24* (2013.01); *B60B 2360/10* (2013.01); *B60B 2900/572* (2013.01); *B60B 2900/731* (2013.01)

(58) Field of Classification Search
CPC ....... B60B 15/26; B60B 15/263; B60B 11/02; B60B 11/10
See application file for complete search history.

(56) References Cited

U.S. PATENT DOCUMENTS

| | | | |
|---|---|---|---|
| 1,572,806 A * | 2/1926 | Peterson ............... | B60B 15/263 301/40.2 |
| 1,712,322 A | 5/1929 | Bachrach | |
| 2,209,967 A * | 8/1940 | Golod ..................... | B60B 11/10 301/40.3 |
| 2,228,423 A | 1/1941 | Ticktin | |
| 2,233,742 A | 3/1941 | Lowry | |
| 2,533,869 A | 12/1950 | Irving | |
| 2,553,891 A * | 5/1951 | Brosick ................... | B60B 11/10 301/40.3 |
| 2,682,431 A * | 6/1954 | Dovberg ................. | B60B 11/10 301/40.3 |
| 3,397,014 A * | 8/1968 | Nigrelli ................... | B60B 11/10 301/40.3 |
| 3,508,790 A * | 4/1970 | Holmes ................... | B60B 11/10 301/39.1 |
| 3,644,001 A | 2/1972 | Lavallee | |
| 4,666,216 A | 5/1987 | Smith | |
| 5,551,762 A | 9/1996 | Roopngam | |
| 6,217,125 B1 | 4/2001 | Tubetto | |
| 2006/0238018 A1 | 10/2006 | Sample | |

FOREIGN PATENT DOCUMENTS

| | | | | |
|---|---|---|---|---|
| DE | 003326011 A1 * | 1/1985 | ............. | B60B 11/10 |
| EP | 0402327 A1 * | 5/1990 | ............. | B60B 15/26 |

* cited by examiner

*Primary Examiner* — Jason R Bellinger

(57) ABSTRACT

The vehicle wheel rim with integral spare tire includes a main wheel and an integral spare tire. The main wheel includes a main rim well, an inner and outer flange, and a center disc. A main tire may be mounted onto the main wheel and the main wheel may be bolted onto a hub on an axle of a vehicle. The integral spare tire includes a safety rim well, safely rim, and safety tire with the safety tire mounted on the safety rim. The integral spare tire is coupled to the inside of the main wheel. The dimensions of the main wheel, main tire, and integral spare tire are such that when the main tire is inflated the integral spare tire does not touch the road surface. However if the main tire goes flat the integral spare tire will touch the road surface and will support the vehicle.

5 Claims, 5 Drawing Sheets

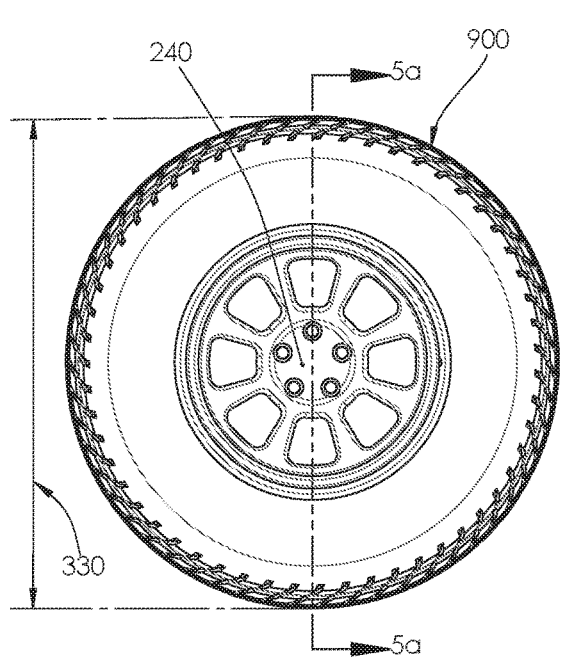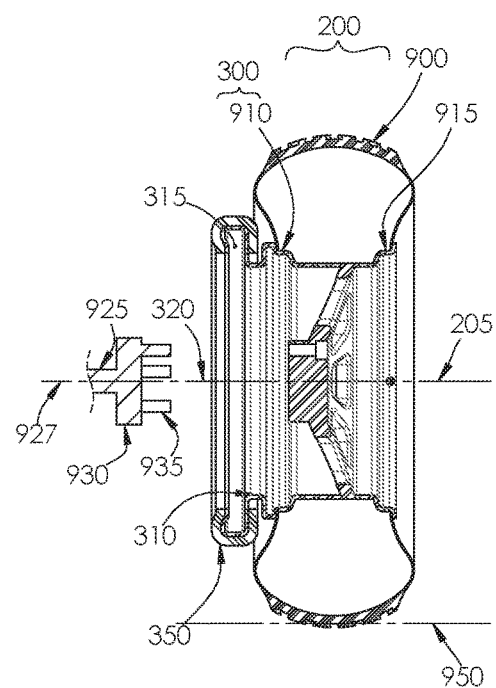
Figure 5
Figure 5a

VEHICLE WHEEL RIM WITH INTEGRAL SPARE TIRE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular safety, more specifically, a vehicle wheel rim with integral spare tire.

SUMMARY OF INVENTION

The vehicle wheel rim with integral spare tire comprises a main wheel and an integral spare tire. The main wheel comprises a main rim well, an inner and outer flange, and a center disc. A main tire may be mounted onto the main wheel and the main wheel may be bolted onto a hub on an axle of a vehicle. The integral spare tire comprises a safety rim well, safely rim, and safety tire with the safety tire mounted on the safety rim. The integral spare tire is coupled to the inside of the main wheel. The dimensions of the main wheel, main tire, and integral spare tire are such that when the main tire is inflated the integral spare tire does not touch the road surface. However if the main tire goes flat the integral spare tire will touch the road surface and will support the vehicle.

An object of the invention is to provide a wheel for a vehicle with an integral spare tire.

Another object of the invention is to provide an integral spare tire that does not touch the road surface when the main tire is inflated.

A further object of the invention is to provide an integral spare tire that touches the road surface when the main tire is flat.

Yet another object of the invention is to provide an integral spare tire that is hidden behind the main tire when the vehicle is viewed from a distance.

These together with additional objects, features and advantages of the vehicle wheel rim with integral spare tire will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle wheel rim with integral spare tire in detail, it is to be understood that the vehicle wheel rim with integral construction and arrangements of the components set forth in the following description or illustration. Those skilled in the art will appreciate that the concept of this disclosure may be readily utilized as a basis for the design of other structures, methods, and systems for carrying out the several purposes of the vehicle wheel rim with integral spare tire.

It is therefore important that the claims be regarded as including such equivalent construction insofar as they do not depart from the spirit and scope of the vehicle wheel rim with integral spare tire. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the

FIG. 5 is a front view of an embodiment of the disclosure showing the main tire installed on the main wheel.

FIG. 5a is a cross-sectional view of an embodiment of the disclosure across 5a-5a as shown in FIG. 5.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, theory presented in the preceding technical field, background, brief summary or the following detailed description. As used herein, the word "or" is intended to be inclusive.

Figure 1:
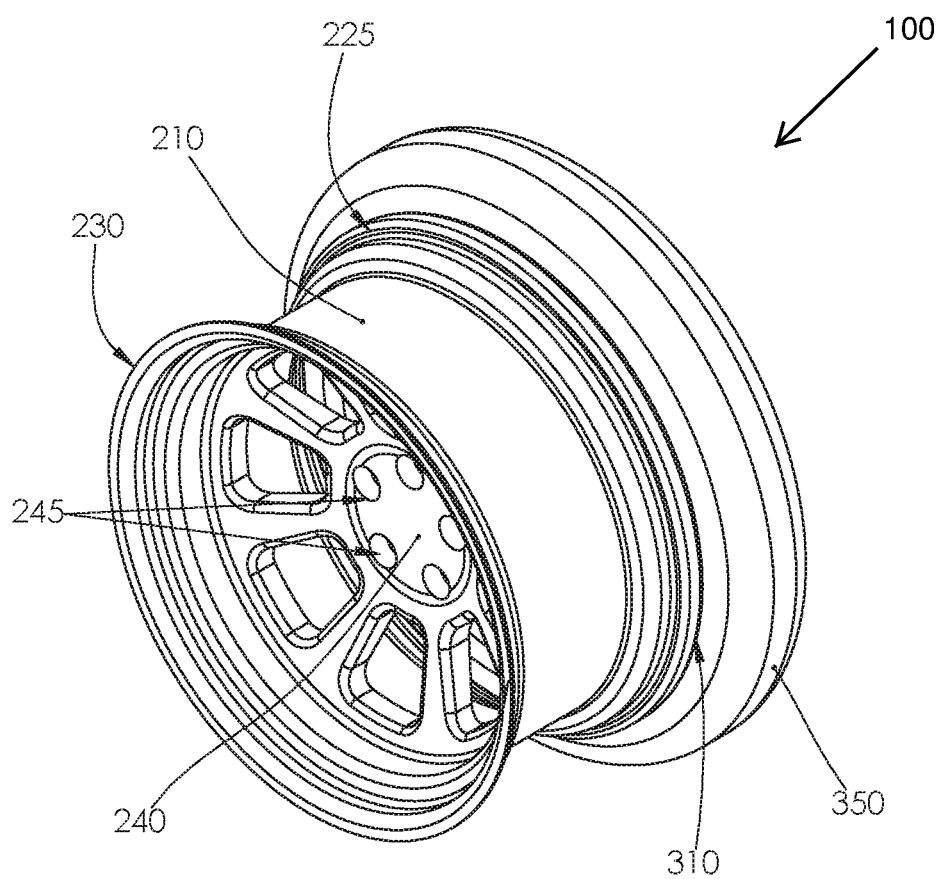
Figure 2:
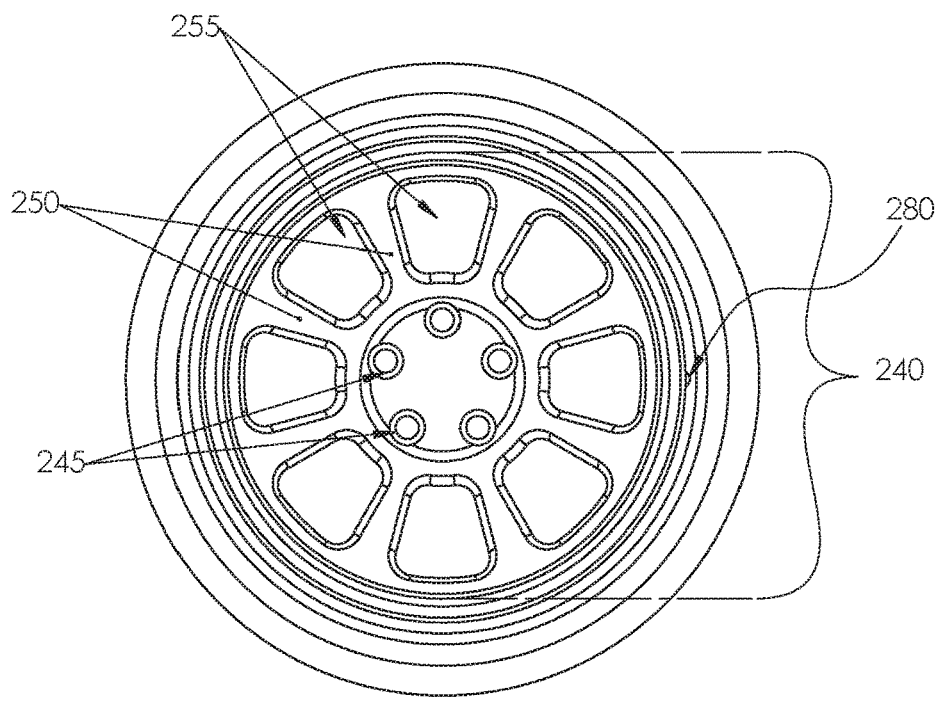
FIG. 2 is a front view of an embodiment of the disclosure.
Figure 3:
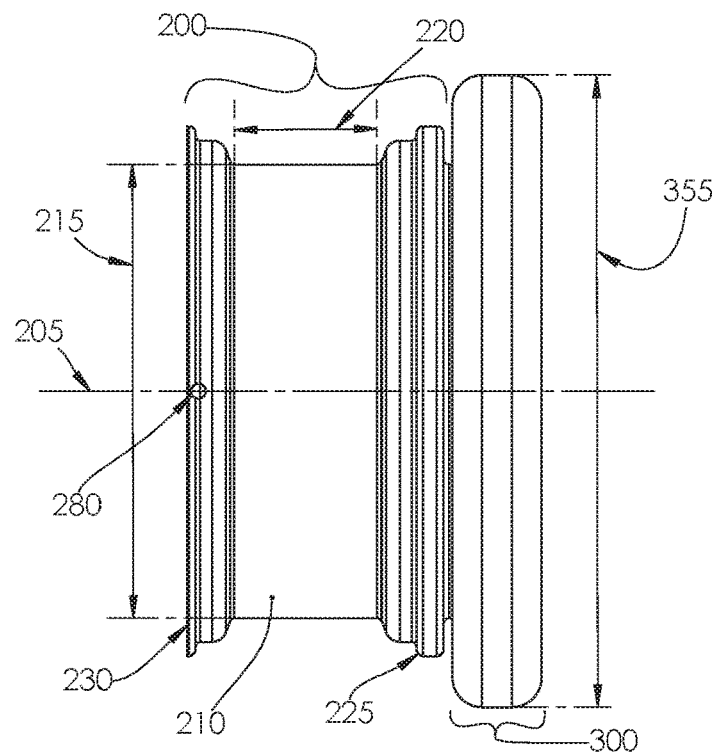
FIG. 3 is a side view of an embodiment of the disclosure.
Figure 4:
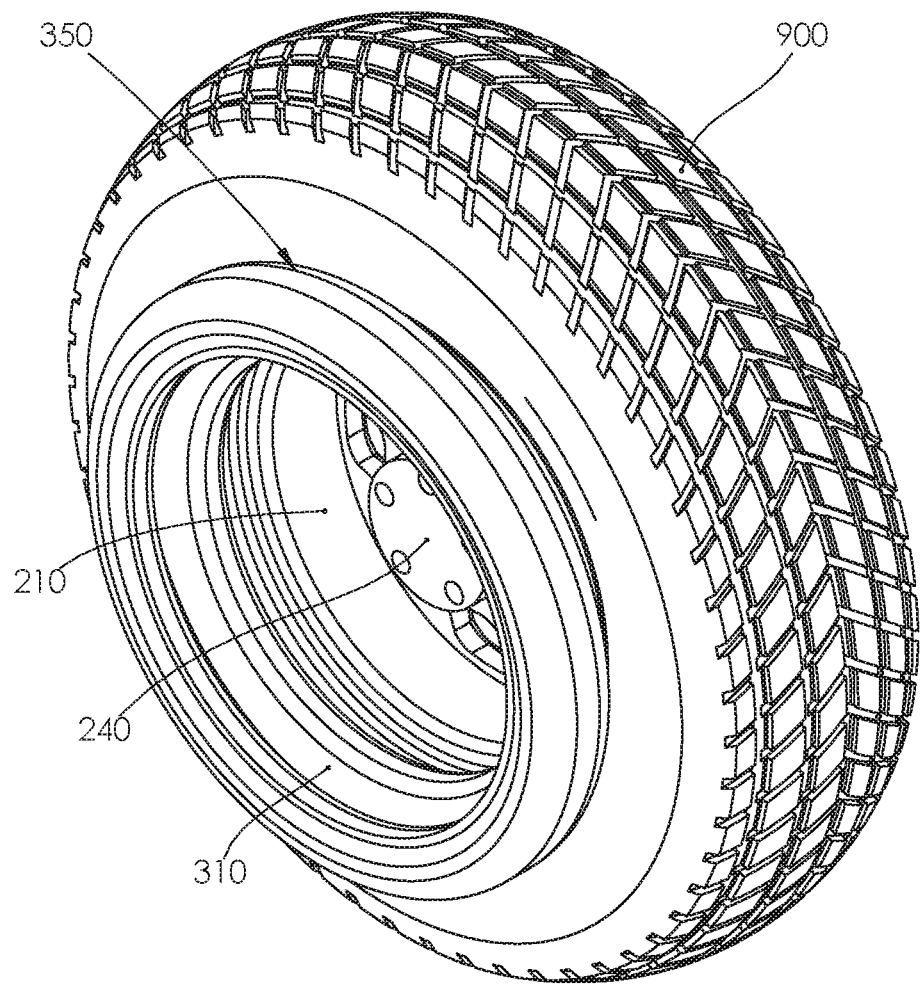
FIG. 4 is a perspective view of an embodiment of the disclosure showing the main tire installed on the main wheel.
Figure 6:
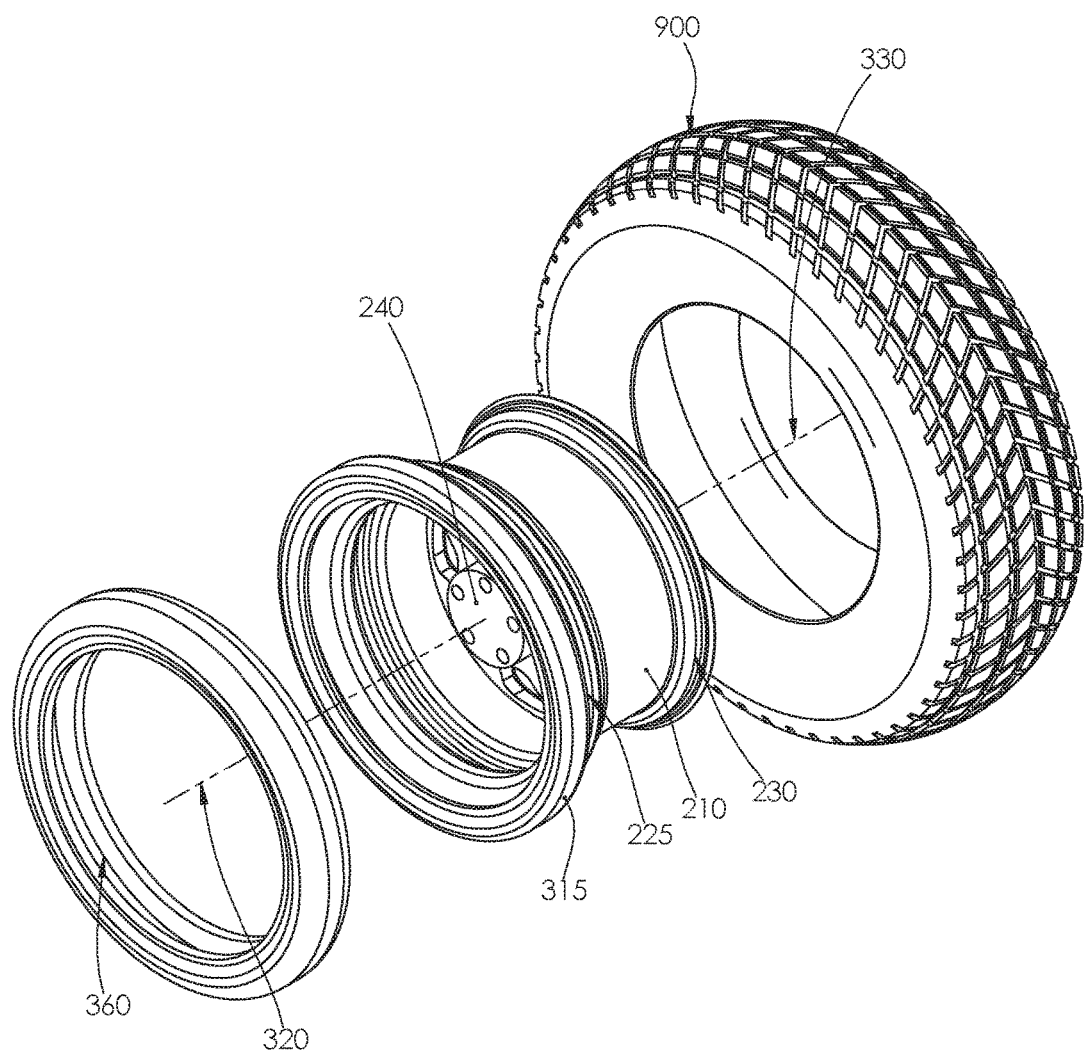
FIG. 6 is an exploded view of an embodiment of the disclosure including the main tire.

Detailed reference will now be made to a first potential embodiment of the disclosure, which is illustrated in FIGS. 1 through 6.

The vehicle wheel rim with integral spare tire 100 (hereinafter invention) comprises a main wheel 200 and an integral spare tire 300. The integral spare tire 300 may be a spare tire that is coupled to the main wheel 200, physically smaller in size than a main tire 900 and is immediately available for use when the main tire 900 fails.

Throughout this disclosure, directional references of "up" and "down" use a gravitational reference frame where down is the direction that gravity pulls and object and up is the opposite of down. "Inside" or "rear" refers to the side if the invention 100 that is closest to the center of a vehicle (not illustrated in the figures) when the invention 100 is mounted to an axle 925 of the vehicle. "Outside" or "front" refer to the side of the invention 100 that is opposite the inside or rear of the invention 100.

The main wheel 200 comprises a main rim well 210, an inner flange 225, an outer flange 230, a center disc 240, and a plurality of lug holes 245. The main wheel 200 may be a circular, metal component that mounts to the axle 925 of the vehicle. The main wheel 200 may be composed of a metal or composite materials. As non-limiting examples, the main wheel 200 may be composed of steel alloys, aluminum alloys, magnesium alloys, titanium allows, or carbon fiber resins.

The main rim well 210 may be a cylindrical tube oriented such that a longitudinal axis of the rim well 205 is aligned with and coincides with a longitudinal axis of the axle 927. A diameter of the main rim well 215 and a width of the main rim well 220 may vary and are determined based upon the characteristics of the vehicle. As non-limiting examples, characteristics of the vehicle, which may influence the diameter of the main rim well 215 and the width of the main rim well 220 may include physical size of the vehicle, weight of the vehicle and intended usage of the vehicle.

The inner flange 225 may be a projecting collar that circumscribes the main rim well 210 at the inside edge of the main rim well 210. The inner flange 225 may be oriented to project away from the center of the main rim well 210.

The outer flange 230 may be a projecting collar that circumscribes the main rim well 210 at the outside edge of the main rim well 210. The outer flange 230 may be oriented to project away from the center of the main rim well 210.

The inner flange 225 and the outer flange 230 together comprise contact points and restraints for the bead of the main tire 900. Specifically, a main tire inner bead 910 presses against the inner flange 225 when the main tire 900 is inflated and a main tire outer bead 915 presses against the outer flange 230 when the main tire 900 is inflated. The seal formed by the main tire inner bead 910 pressing against the inner flange 225 and the main tire outer bead 915 pressing against the outer flange 230 holds air in the main tire 900.

The center disc 240 may comprise the center of the main wheel 200. The centermost portion of the center disc 240 may be flat and oriented to line in a plane that is perpendicular to the longitudinal axis of the rim well 205.

The centermost portion of the center disc 240 may comprise the plurality of lug holes 245 which allow the main wheel 200 to be mounted onto the axle 925. The plurality of lug holes 245 may be arranged to form a ring of the plurality of lug holes 245 that is centered on the main wheel 200 and oriented to pass through the center disc 240 from inside to outside. The diameter of the ring may be configured to match the diameter of a plurality of lug bolts 935 on a hub 930 of the axle 925.

The remainder of the center disc 240 that is outside of the plurality of lug holes 245 may extend to and may couple to the main rim well 210 of the main wheel 200. The remainder of the center disc 240 may be planar or may be concave as viewed from the outside.

In some embodiments, the center disc 240 may comprise a plurality of spokes 250 and/or a plurality of wheel apertures 255. The plurality of spokes 250 or the material that remains after the plurality of wheel apertures 255 are made in the center disc 240 may couple the centermost portion of the center disc 240 to the main rim well 210. Removing material from the center disc 240 by using the plurality of spokes 250 and/or the plurality of wheel apertures 255 may reduce the weight of the main wheel 200.

The integral spare tire 300 comprises a safety rim well 310, a safety rim 315, and a safety tire 350. The integral spare tire 300 may be a non-pneumatic, emergency tire that is integrated with the main wheel 200. The integral spare tire 300 may be located on the inside of the main wheel 200 and thus may be hidden by the main tire 900.

An outer diameter of the spare tire 355 may be smaller than a diameter of the main tire 330 when the main tire 900 is inflated. The outer diameter of the spare tire 355 may be larger than the diameter of the main rim well 215.

The integral spare tire 300 may be suspended above a road surface 950 when the main tire 900 is inflated. The integral spare tire 300 may contact the road surface 950 when the main tire 900 is deflated.

The safety barrel 310 may be a cylindrical tube oriented such that a longitudinal axis of the safety rim well 320 is aligned with and coincides with the longitudinal axis of the axle 927 and with the longitudinal axis of the rim well 205. The safety rim well 310 may be coupled to the main wheel 200 so that is turns with the main wheel 200. A diameter of the safety rim well (not illustrated in the figures) may be the same as the diameter of the main rim well 215, however it is not required that the diameter of the safety rim well and the diameter of the main rim well 215 are the same. The safety rim well 310 may extend inward from the main wheel 200.

The safety rim 315 may be a circular rib that circumscribes the safety rim well 310. The safety rim 315 may project from the safety rim well 310 in a direction that is perpendicular to the longitudinal axis of the safety rim well 320 and the center of the safety rim well 310. The safety rim 315 may retain the safety tire 350 on the integral spare tire 300.

The safety tire 350 may be a toroid composed of a solid, elastic material. As non-limiting examples, the safety tire 350 may be composed of a compound based upon natural or synthetic rubber. A mounting groove 360 may circumscribe the inner circumference of the safety tire 350. The safety tire 350 may be mounted by placing the safety tire 350 over the safety rim 315 such that the safety rim 315 fits into the mounting groove 360.

In some embodiments, the main wheel 200 may comprise a valve stem aperture 280. The valve stem aperture 280 may be a hole in the inner flange 225 or in the main rim well 210 configured to accept the installation of a valve stem (not illustrated in the figures). The valve stem aperture 280 may be configured to pass the air into or out of the main tire 900 via the valve stem.

In use, the invention 100 is mounted onto the axle 925 of the vehicle by placing the main wheel 200 over the axle 925 such that the plurality of lug bolts 935 line up with the plurality of lug holes 245 on the center disc 240. A plurality of lug nuts (not illustrated in the figures) is screwed onto the plurality of lug bolts 935 to hold the main wheel 200 in place. The invention 100 is placed onto the axle 925 oriented with the integral spare tire 300 on the inside of the main wheel 200. The invention 100 is inflated and functions as a normal wheel, resting on the road surface 950 at the bottom of the main tire 900.

As non-limiting examples, the main tire 900 may go flat because of a leak of the air from the valve or from a puncture or due to a sudden failure of the main tire 900, commonly referred to as a blow-pout. If the main tire 900 goes flat, then the main tire 900 is no longer able to hold the axle 925 and the hub 930 at the same height. When the hub 930 is lowered due to flattening of the main tire 900, the integral spare tire 300 is also lowered and may contact the road surface 950.

Once the integral spare tire 300 contacts the road surface 950, the integral spare tire 300 will function as a 'donut' spare tire and will support the weight of the vehicle that was previously borne by the main tire 900. The invention 100 may allow the vehicle to safely exit the highway and seek service.

As used in this disclosure, an "aperture" is an opening in a surface. Aperture may be synonymous with hole, slit, crack, gap, slot, or opening.

As used in this disclosure, an "axle" is a cylindrical shaft that is inserted through the center of an object such that the center axis of the object and the center axis of the axle are aligned and the object can rotate using the axle as an axis of rotation.

As used in this disclosure, a "collar" is a ring like device that is placed around an object.

As used in this disclosure, "concave" is used to describe a surface that resembles the interior surface of a sphere or a As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, "elastic" refers to a material or object that deforms when a force is applied to it and that is able to return to its relaxed shape after the force is removed. A material that exhibits these qualities is also referred to as an elastomeric material.

As used in this disclosure, a "flange" is a protruding rib, edge, or collar that is used to hold an object in place or to attach a first object to a second object.

As used herein, the word "longitudinal" or "longitudinally" refers to a lengthwise or longest direction.

As used herein, a "ring" is a circular or surrounding line or mark.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

As used in this disclosure, a "vehicle" is a device that is used for transporting passengers, goods, or equipment.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A vehicle wheel rim with integral spare tire comprising:
a main wheel and an integral spare tire;
wherein the integral spare tire is a spare tire that is coupled to the main wheel, physically smaller in size than a main tire and is immediately available for use when the main tire fails;
wherein the main wheel comprises a main rim well, an inner flange, an outer flange, a center disc, and a plurality of lug holes;
wherein the main wheel is a circular, metal component that mounts to an axle of a vehicle;
wherein the main rim well is a cylindrical tube oriented such that a longitudinal axis of the rim well is aligned with and coincides with a longitudinal axis of the axle;
wherein the inner flange is a projecting collar that circumscribes the main rim well at the inside edge of the main rim well;
wherein the inner flange is oriented to project away from the center of the main rim well;
wherein the outer flange is a projecting collar that circumscribes the main rim well at the outside edge of the main rim well;
wherein the outer flange is oriented to project away from the center of the main rim well;
wherein the inner flange and the outer flange together comprise contact points and restraints for the bead of the main tire;
wherein a main tire inner bead presses against the inner flange when the main tire is inflated and a main tire outer bead presses against the outer flange when the main tire is inflated;
wherein the seal formed by the main tire inner bead pressing against the inner flange and the main tire outer bead pressing against the outer flange holds air in the main tire;
wherein the center disc comprises the center of the main wheel;
wherein the centermost portion of the center disc is oriented to lie in a plane that is perpendicular to the longitudinal axis of the rim well;
wherein the centermost portion of the center disc comprises the plurality of lug holes which allow the main wheel to be mounted onto the axle;
wherein the plurality of lug holes are arranged to form a ring that is centered on the main wheel and oriented to pass through the center disc from inside to outside;
wherein the diameter of the ring is configured to match the diameter of a plurality of lug bolts on a hub of the axle;
wherein the remainder of the center disc that is outside of the plurality of lug holes extend to and couple to the main rim well of the main wheel;
wherein the remainder of the center disc is planar or is concave;
wherein the integral spare tire comprises a safety rim well, a safety rim, and a safety tire;
wherein the integral spare tire is a non-pneumatic, emergency tire that is integrated with the main wheel;
wherein the integral spare tire is located on the inside of the main wheel and thus is hidden by the main tire;
wherein an outer diameter of the spare tire is smaller than a diameter of the main tire when the main tire is inflated;
wherein the outer diameter of the spare tire is larger than a diameter of the main rim well;
wherein the integral spare tire is suspended above a road surface when the main tire is inflated;
wherein the integral spare tire contacts the road surface when the main tire is deflated;

wherein the safety rim well is a cylindrical tube oriented such that a longitudinal axis of the safety rim well is aligned with and coincides with the longitudinal axis of the axle and with the longitudinal axis of the main rim well;

wherein the safety rim well is coupled to the main wheel so that the safety rim well turns with the main wheel.

2. The vehicle wheel rim with integral spare tire according to claim 1 wherein the center disc comprises a plurality of spokes and/or a plurality of wheel apertures;

wherein the plurality of spokes or the material that remains after the plurality of wheel apertures are made in the center disc couple the centermost portion of the center disc to the main rim well.

3. The vehicle wheel rim with integral spare tire according to claim 1 wherein the safety rim is a circular rib that circumscribes the safety rim well;

wherein the safety rim projects from the safety rim well in a direction that is perpendicular to the longitudinal axis of the safety rim well and the center of the safety rim well;

wherein the safety rim retains the safety tire on the integral spare tire.

4. The vehicle wheel rim with integral spare tire according to claim 3 wherein the safety tire is a toroid composed of a solid, elastic material;

wherein a mounting groove circumscribes the inner circumference of the safety tire;

wherein the safety tire is mounted by placing the safety tire over the safety rim such that the safety rim fits into the mounting groove.

5. The vehicle wheel rim with integral spare tire according to claim 4 wherein the main wheel comprises a valve stem aperture;

wherein the valve stem aperture is a hole in the inner flange or in the main rim well configured to accept the installation of a valve stem;

wherein the valve stem aperture is configured to pass the air into or out of the main tire via the valve stem.

* * * * *